(12) United States Patent
Hayashi

(10) Patent No.: US 10,734,754 B2
(45) Date of Patent: Aug. 4, 2020

(54) COVER MEMBER AND DEVICE CONNECTOR

(71) Applicant: SUMITOMO WIRING SYSTEMS, LTD., Yokkaichi-shi, Mie (JP)

(72) Inventor: Masashi Hayashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/480,096

(22) PCT Filed: Jan. 18, 2018

(86) PCT No.: PCT/JP2018/001450
§ 371 (c)(1),
(2) Date: Jul. 23, 2019

(87) PCT Pub. No.: WO2018/139340
PCT Pub. Date: Aug. 2, 2018

(65) Prior Publication Data
US 2019/0393644 A1    Dec. 26, 2019

(30) Foreign Application Priority Data

Jan. 26, 2017   (JP) ................. 2017-012151

(51) Int. Cl.
*H01R 13/52* (2006.01)
*B60R 16/02* (2006.01)
(Continued)

(52) U.S. Cl.
CPC ..... *H01R 13/5213* (2013.01); *B60R 16/0215* (2013.01); *H01R 13/74* (2013.01);
(Continued)

(58) Field of Classification Search
CPC ........ H01R 4/70; H01R 4/22; H01R 13/5213; H01R 13/74; B60R 16/0215; B60R 16/033; B60K 6/22; B60Y 2200/92
(Continued)

(56) References Cited

U.S. PATENT DOCUMENTS 5,338,898 A * 8/1994 Luciano ............... H01R 4/70
174/138 F
5,413,500 A * 5/1995 Tanaka ................. H01R 4/22
439/521

(Continued)

OTHER PUBLICATIONS

Apr. 3, 2018 International Search Report issued in International Patent Application No. PCT/JP2018/001450.

*Primary Examiner* — Gary F Paumen
(74) *Attorney, Agent, or Firm* — Oliff PLC

(57) ABSTRACT

A cover that includes a main body covering to be attached to a connector main body including an insertion hole through which a bolt for attaching to a device can be inserted; and a bolt covering that is formed integrally with the main body covering and is for covering a head of the bolt inserted through the insertion hole, wherein: the main body covering includes: a cylindrical covering for covering the connector main body; and a fixing member for fixing the covering in a fastened state to the connector main body, the bolt covering is formed so as to extend outward in a radial direction of the covering from an outer circumferential surface of the covering, and the bolt covering is an integral product made of elastic synthetic resin that is formed integrally with the covering.

2 Claims, 5 Drawing Sheets

(51) Int. Cl.
*H01R 13/74* (2006.01)
*B60K 6/22* (2007.10)
*B60R 16/033* (2006.01)

(52) U.S. Cl.
CPC ............. *B60K 6/22* (2013.01); *B60R 16/033* (2013.01); *B60Y 2200/92* (2013.01)

(58) Field of Classification Search
USPC ................................................ 439/521, 801
See application file for complete search history.

(56) References Cited

U.S. PATENT DOCUMENTS

| | | | | |
|---|---|---|---|---|
| 5,791,936 | A * | 8/1998 | Nicholson | H01R 13/5213 |
| | | | | 439/521 |
| 5,804,770 | A * | 9/1998 | Tanaka | H01M 2/206 |
| | | | | 174/138 F |
| 6,533,619 | B2 * | 3/2003 | Wakata | H01R 11/283 |
| | | | | 439/202 |
| 6,705,889 | B2 * | 3/2004 | Nishimoto | H01R 11/12 |
| | | | | 439/521 |
| 9,279,442 | B2 * | 3/2016 | Naylor | F16B 37/14 |
| 9,376,069 | B2 * | 6/2016 | Nakai | H01R 13/5219 |
| 9,407,049 | B2 * | 8/2016 | Ishibashi | H01R 13/6397 |
| 9,806,454 | B2 * | 10/2017 | Nakai | B60R 16/0222 |
| 2013/0059466 | A1 | 3/2013 | Ishibashi et al. | |
| 2014/0127939 | A1 | 5/2014 | Ishibashi et al. | |
| 2015/0207533 | A1 * | 7/2015 | Ferraro | H01R 13/5213 |
| | | | | 455/558 |
| 2015/0318679 | A1 | 11/2015 | Nakai et al. | |
| 2015/0364856 | A1 | 12/2015 | Nakai | |
| 2017/0370397 | A1 * | 12/2017 | Oso | F16B 39/08 |

\* cited by examiner

COVER MEMBER AND DEVICE CONNECTOR

This application is the U.S. National Phase of PCT/JP2018/001450 filed Jan. 18, 2018, which claims priority to JP 2017-012151 filed Jan. 26, 2017, the entire disclosure of which is incorporated herein by reference.

BACKGROUND

The present disclosure relates to a cover member and a device connector.

Conventionally, a device connector that is to be fixed by a fastening bolt to an electrical device such as an inverter mounted in a vehicle has been proposed. With this kind of device connector, a bolt cap is mounted in order to make the fastening bolt less visible or arouse caution with respect to the fastening bolt (e.g., see JP 2013-54929A).

SUMMARY

Incidentally, there has been demand for a reduction of the number of components in the above-described device connector.

An exemplary aspect of the disclosure provides a cover member and device connector with reduced numbers of components.

A cover member according to an exemplary aspect of the disclosure includes: a main body covering to be attached to a connector main body including an insertion hole through which a bolt for attaching to a device can be inserted; and a bolt covering that is formed integrally with the main body covering and is for covering a head of the bolt inserted through the insertion hole.

According to this configuration, the bolt covering that covers the head of the bolt for attaching the connector main body to the device is formed integrally with the main body covering covering the connector main body, and therefore there are fewer components compared to a configuration in which, for example, a bolt cap into which a bolt is inserted and that covers the head of the bolt is prepared separately. Also, by attaching the main body covering to the connector main body, the bolt covering is also attached to the connector main body, and therefore the number of man-hours for assembly and the labor of separately preparing a component are reduced.

In the above-described cover member, it is preferable that the main body covering includes: a cylindrical covering for covering the connector main body; and a fixing member for fixing the covering in a fastened state to the connector main body, and the bolt covering is formed integrally with the covering.

According to this configuration, the covering for covering the connector main body is fixed in a state of being fastened to the connector main body by a fixing member. Also, since the bolt covering is formed integrally with the covering, there are fewer components compared to a configuration in which a bolt cap is prepared separately.

In the above-described cover member, it is preferable that the bolt covering is formed so as to extend outward in a radial direction of the covering from an outer circumferential surface of the covering.

According to this configuration, the bolt covering for covering the head of the bolt can be formed integrally with the cylindrical covering for covering the connector main body.

In the above-described cover member, it is preferable that a slit is formed in the bolt covering, and part of the head of the bolt is exposed by the slit.

According to this configuration, by folding back the bolt covering using the slit to expose the entirety of the head of the bolt, a tool can easily be set on the head of the bolt.

In the above-described cover member, the bolt covering preferably has a tab that extends outward.

According to this configuration, by folding back the bolt covering using the tab to expose the entirety of the head of the bolt, a tool can easily be set on the head of the bolt.

In the above-described cover member, it is preferable that the main body covering portion includes: a cylindrical covering for covering the connector main body; and a fixing member for fixing the covering in a fastened state to the connector main body, the bolt covering is connected to the fixing member via a flexible coupling, and the bolt covering, the coupling, and the fixing member are formed integrally.

According to this configuration, the covering for covering the connector main body is fixed in a state of being fastened to the connector main body by a fixing member. Also, since the bolt covering is formed integrally with the fixing member, there are fewer components compared to a configuration in which a bolt cap is prepared separately.

A device connector for solving the above-described problem includes the above-described cover and a connector main body.

According to this configuration, the bolt covering that covers the head of the bolt for attaching the connector main body to the device is formed integrally with the main body covering the connector main body, and therefore there are fewer components compared to a configuration in which, for example, a bolt cap into which a bolt is inserted and that covers the head of the bolt is provided separately. Also, by attaching the main body covering to the connector main body, the bolt covering is also attached to the connector main body, and therefore the number of man-hours for assembly and the labor of separately preparing a component are reduced.

According to the device connector of the present disclosure, the number of components can be reduced.

DETAILED DESCRIPTION OF EMBODIMENTS

Figure 1A:
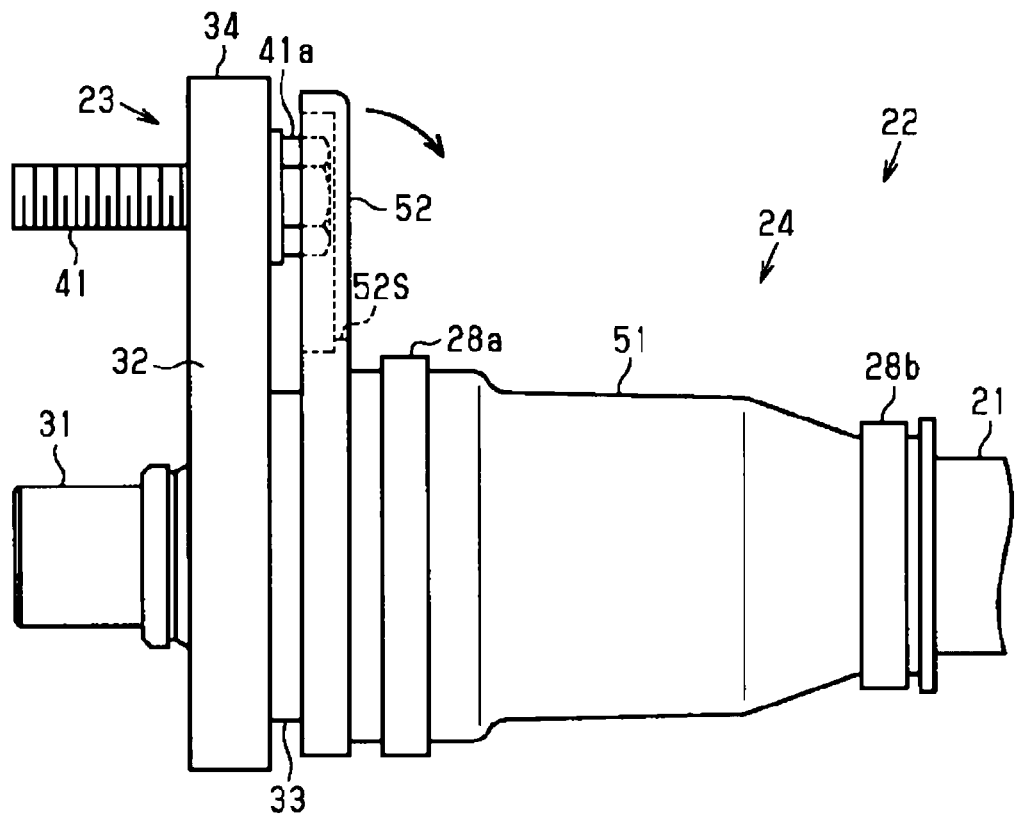
FIG. 1(a) is a schematic side view of a device connector of a first embodiment.

Hereinafter, embodiments will be described.

Note that in the accompanying drawings, constituent elements are shown enlarged in some cases in order to facilitate comprehension. The dimensional proportions of the constituent elements differ from the actual dimensional proportions or from other dimensional proportions in the drawings in some cases. Also, in cross-sectional drawings, hatching of some constituent elements is omitted in some cases in order to facilitate comprehension.

Figure 5:
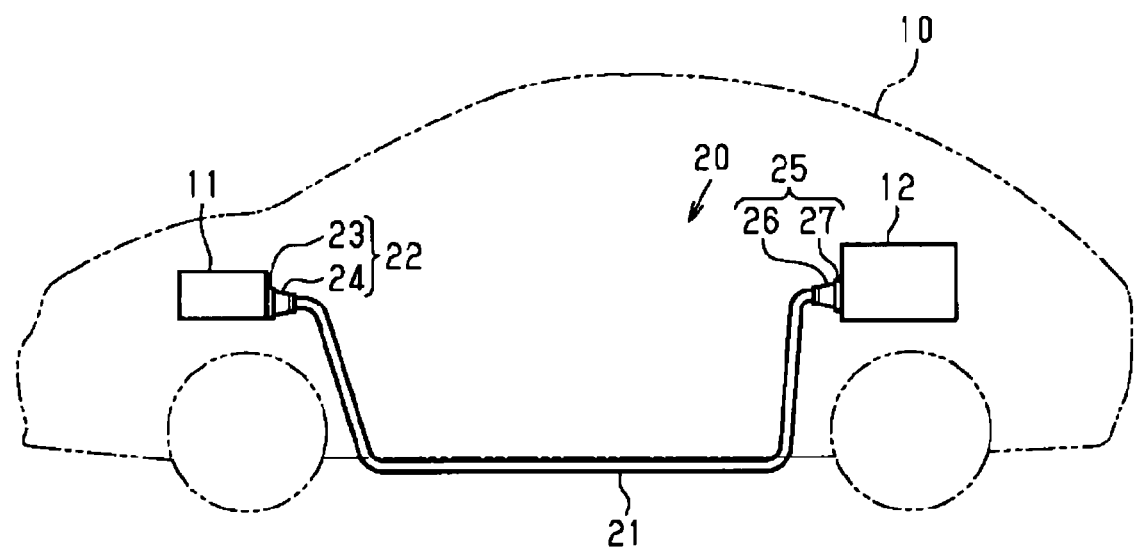
FIG. 5 is a schematic view showing an example of a routing state of a wire harness.

A vehicle 10 shown in FIG. 5 is a hybrid car, an electric automobile, or the like, for example. The vehicle 10 includes: an inverter 11 serving as a device; a high-voltage battery 12; an inverter 11; and a wire harness 20 for electrically connecting the inverter 11 and the high-voltage battery 12. The inverter 11 is mounted in the front portion of the vehicle 10, and the high-voltage battery 12 is mounted in the rear portion of the vehicle 10. The wire harness 20 is routed so as to pass under the floor of the vehicle 10.

The wire harness 20 includes a protective tube 21 and device connectors 22 and 25. The device connectors 22 and 25 include connector main bodies 23 and 26 and cover members 24 and 27. A wire (not shown) for electrically connecting the inverter 11 and the high-voltage battery 12 is inserted through the protective tube 21. The protective tube 21 protects the wire from water, flying stones, and the like. For example, a metal pipe of aluminum or the like, a corrugated tube that is composed of resin or the like and is flexible, or the like, or a combination thereof can be used as the protective tube 21.

The device connector 22 is connected to the inverter 11, and the device connector 25 is connected to the high-voltage battery 12. The cover members 24 and 27 are formed into cylindrical shapes overall. The cover members 24 and 27 are fixed to the connector main bodies 23 and 26 so as to cover portions of the connector main bodies 23 and 26. Also, the cover members 24 and 27 are formed so as to bridge between the connector main bodies 23 and 26 and the protective tube 21.

As shown in FIG. 1(a), the device connector 22 includes: the connector main body 23; the cover member 24 serving as a main body covering portion (main body covering) and a covering member; and fastening bands 28a and 28b serving as main body covering portions and fixing members.

The connector main body 23 includes: a male connector 31 serving as a connection member; and a cylindrical shield shell (connector shell) 32 that covers the male connector 31. The male connector 31 includes a housing and a male terminal arranged inside of the housing, and the male terminal is connected to the wire inserted into the protective tube 21. The housing is composed of, for example, an insulating synthetic resin. The shield shell 32 is composed of a conductive metal (e.g., aluminum or iron).

The cover member 24 is formed so as to cover the connector main body 23. Also, the cover member 24 is formed so as to bridge between the connector main body 23 and the protective tube 21. The cover member 24 is fixed by being fastened to the connector main body 23 by the fastening band 28a. Also, the cover member 24 is fixed by being fastened to the protective tube 21 by the fastening band 28b.

Figure 2:
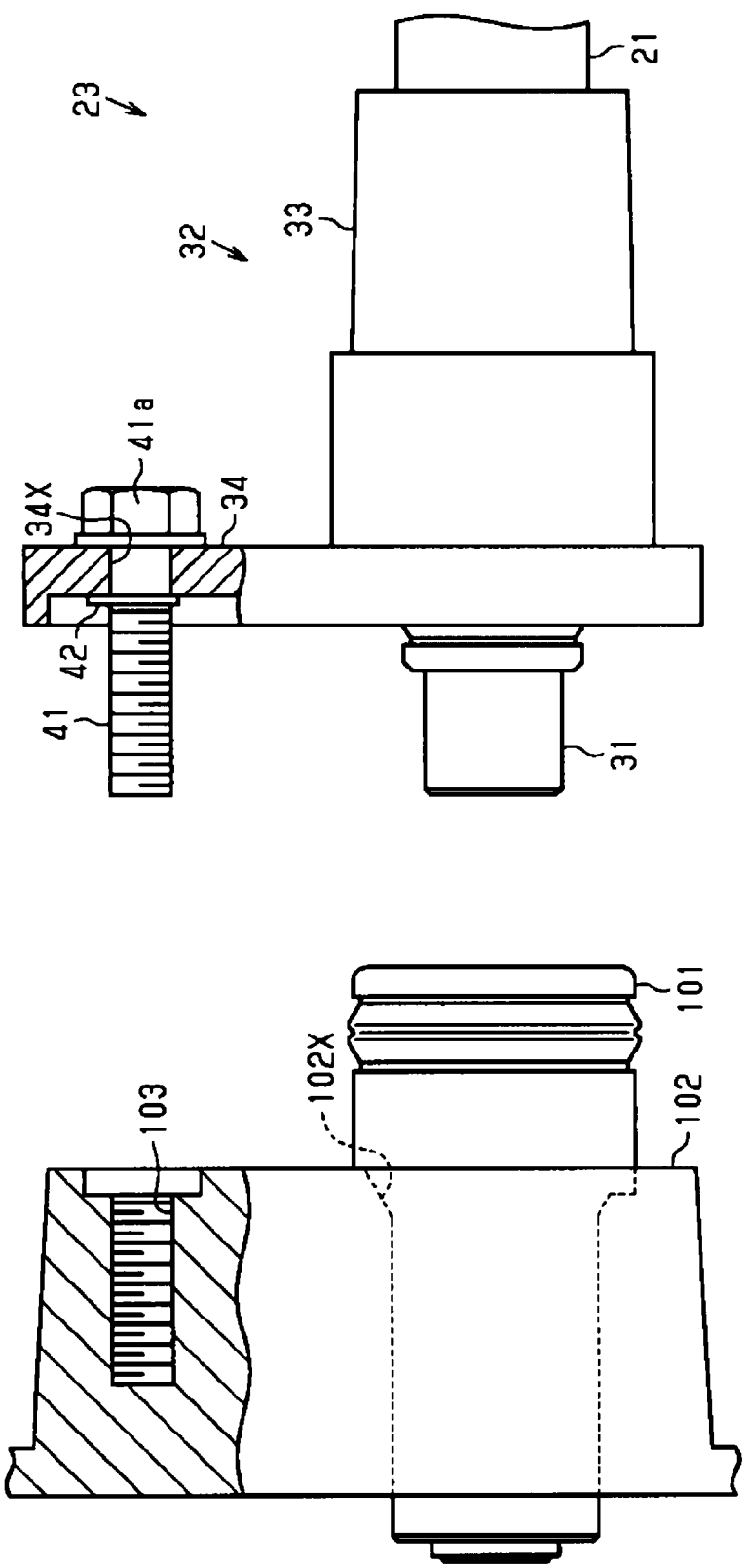
FIG. 2 is a partial cross-sectional view showing an overview of a device connector and a device-side connector.

As shown in FIG. 2, the shield shell 32 includes: a holding portion 33 formed into a cylindrical shape; and a stand portion 34 that extends outward in a radial direction (the upper side in FIG. 2) from the end portion of the holding portion (the left end in FIG. 2). The holding portion 33 holds the male connector 31. An insertion hole 34X that penetrates through the stand portion 34 in the plate thickness direction is formed in the stand portion 34. A fastening bolt 41 is inserted through the insertion hole 34X. A groove into which a C ring 42 is to be attached is formed in the fastening bolt 41. Due to the C ring 42 being attached to the fastening bolt 41 inserted through the insertion hole 34X, the shaft of the fastening bolt 41 is supported in a state of being retained in the stand portion 34.

The male connector 31 of the device connector 22 is connected to a female connector 101 of the device. The female connector 101 of the device is mounted on the inverter 11 shown in FIG. 5.

The female connector 101 is fit into an attachment hole 102X of a device case 102. The device case 102 is the device case of the inverter 11 shown in FIG. 5. The device case 102 is made of a conductive metal. A bolt hole 103 is formed in the device case 102. Due to the fastening bolt 41 of the device connector 22 being screwed into the bolt hole 103, the male connector 31 of the device connector 22 is connected to the female connector 101 of the device.

As shown in FIG. 1(a), the cover member 24 includes: a covering member 51 serving as a main body covering portion; and a bolt covering portion 52 (bolt covering). The covering member 51 is cylindrical and is formed so as to cover the connector main body 23, and more specifically, the holding portion 33. The bolt covering portion 52 is formed so as to extend outward in the radial direction (upward in FIG. 1(a)) from the end portion of the covering member 51 (the left end in FIG. 1(a)).

The covering member 51 is fixed by being fastened to the holding portion 33 of the connector main body 23 by the fastening band 28a serving as the fixing member. Also, the covering member 51 is fixed by being fastened to the protective tube 21 by the fastening band 28b serving as the fixing member. Rubber, elastomer, or the like can be used as the material of the fastening bands 28a and 28b.

Figure 1B:
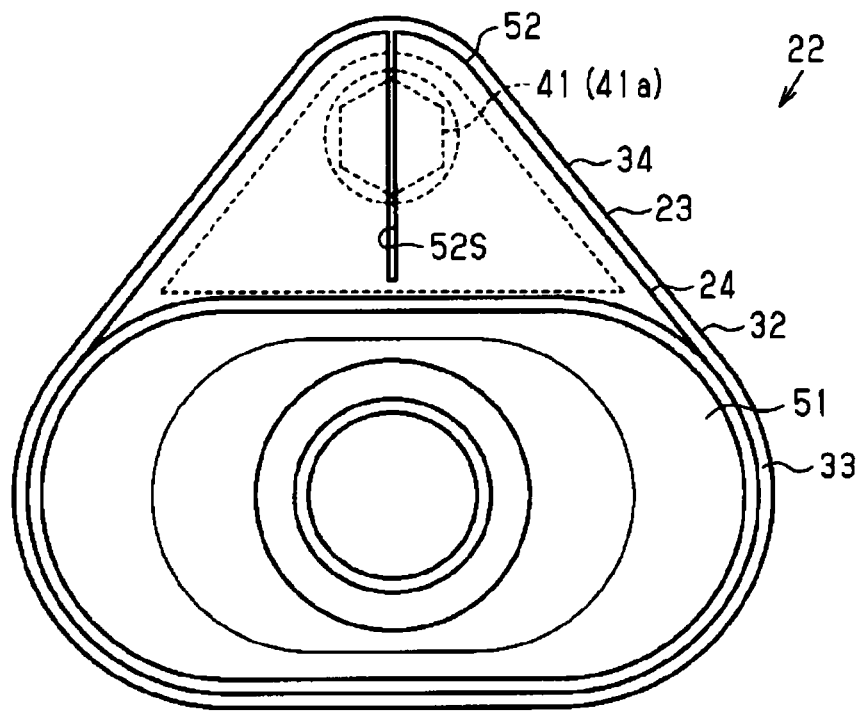
FIG. 1(b) is a schematic front view of the device connector of the first embodiment.

As shown in FIG. 1(b), the bolt covering portion 52 covers the head portion 41a of the fastening bolt 41. The bolt covering portion 52 is formed in an approximately triangular shape, for example. The bolt covering portion 52 has a slit 52S that extends along the radial direction of the fastening bolt 41. The slit 52S is formed so as to divide the portion covering the head portion 41a of the fastening portion 41 into two portions. An elastic material such as rubber or elastomer can be used as the material of the cover member 24.

Action

The cover member 24 includes: the covering member 51 that covers the connector main body 23; and the bolt covering portion 52 that covers the head portion 41a of the fastening bolt 41. Also, the covering member 51 and the bolt covering portion 52 are formed integrally. For this reason, there are fewer components compared to a configuration in which a bolt cap or the like for covering the head portion 41a of the fastening bolt 41 is prepared separately. Also, the workability during assembly of the device connector 22 improves due to the fact that there are fewer components. Also, since the cover member 24 need only be attached to the connector main body 23, it is possible to reduce the occurrence of a defect during assembly, such as forgetting to attach the bolt cap.

The bolt covering portion 52 of the cover member 24 is formed so as to cover the head portion 41a of the fastening bolt 41. Accordingly, the fastening bolt 41 is less visible, and operations on the fastening bolt 41 can be suppressed. Accordingly, it is possible to suppress an action of removing the device connector 22 by loosening the fastening bolt 41 without authorization.

The slit 52S that extends along the radial direction of the fastening bolt 41 is formed in the bolt covering portion 52. With the slit 52S, a tool can be mounted on the head portion 41a of the fastening bolt 41 by folding back the bolt covering portion 52 as shown in FIG. 1(a), and thus the device connector 22 can be fixed to the device case 102 by screwing the fastening bolt 41 into the bolt hole 103 of the device case 102, and the male connector 31 can be connected to the female connector 101.

The cover member 24 is composed of rubber or elastomer, for example. For this reason, by letting go of the folded-back bolt covering portion 52, the bolt covering portion 52 returns to its original shape and covers the head portion 41a of the fastening bolt 41. For this reason, there are fewer work man-hours compared to a configuration in which a bolt cap is held so as to cover the head portion of the fastening bolt 41, and it is possible to prevent the occurrence of forgetting to cover the head portion of the fastening bolt 41, or the like.

As described above, according to the present embodiment, the following effects are demonstrated.

(1-1) The bolt covering portion 52 is formed integrally with the covering member 51 for covering the connector main body 23. For this reason, the number of components can be reduced compared to a configuration in which a bolt cap or the like for covering the head portion 41a of the fastening bolt 41 is prepared separately. Also, the workability during assembly of the device connector 22 can be improved due to the fact that there are fewer components. Also, since the cover member 24 need only be attached to the connector main body 23, it is possible to reduce the occurrence of a defect during assembly, such as forgetting to attach the bolt cap.

(1-2) The bolt covering portion 52 of the cover member 24 is formed so as to cover the head portion 41a of the fastening bolt 41. Accordingly, the fastening bolt 41 is less visible, and operations on the fastening bolt 41 can be suppressed. Accordingly, it is possible to suppress an action of removing the device connector 22 by carelessly loosening the fastening bolt 41.

(1-3) The slit 52S that extends along the radial direction of the fastening bolt 41 is formed in the bolt covering portion 52. With the slit 52S, a tool can be mounted on the head portion 41a of the fastening bolt 41 by folding back the bolt covering portion 52 as shown in FIG. 1(a), and thus the device connector 22 can be connected to the device case 102 by screwing the fastening bolt 41 into the bolt hole 103 of the device case 102, and the male connector 31 can be connected to the female connector 101.

(1-4) The cover member 24 is composed of rubber or elastomer, for example. For this reason, by letting go of the folded-back bolt covering portion 52, the bolt covering portion 52 returns to its original shape and covers the head portion 41a of the fastening bolt 41. For this reason, there are fewer components compared to a configuration in which a bolt cap is held so as to cover the head portion of the fastening bolt 41, and it is possible to prevent the occurrence of forgetting to cover the head portion of the fastening bolt 41, or the like.

(1-5) The bolt covering portion 52 is formed so as to extend outward in the radial direction of the covering member 51 from the outer circumferential surface of the covering member 51. For this reason, the bolt covering portion 52 for covering the head portion 41a of the fastening bolt 41 can be formed integrally with the cylindrical covering member 51 (cylindrical covering) for covering the connector main body 23.

Second Embodiment

Hereinafter, a second embodiment will be described with reference to FIG. 3.

Note that in this embodiment, constituent members that are the same as those in the above-described embodiment are denoted by the same reference numerals thereas, and description thereof is omitted.

Figure 3A:
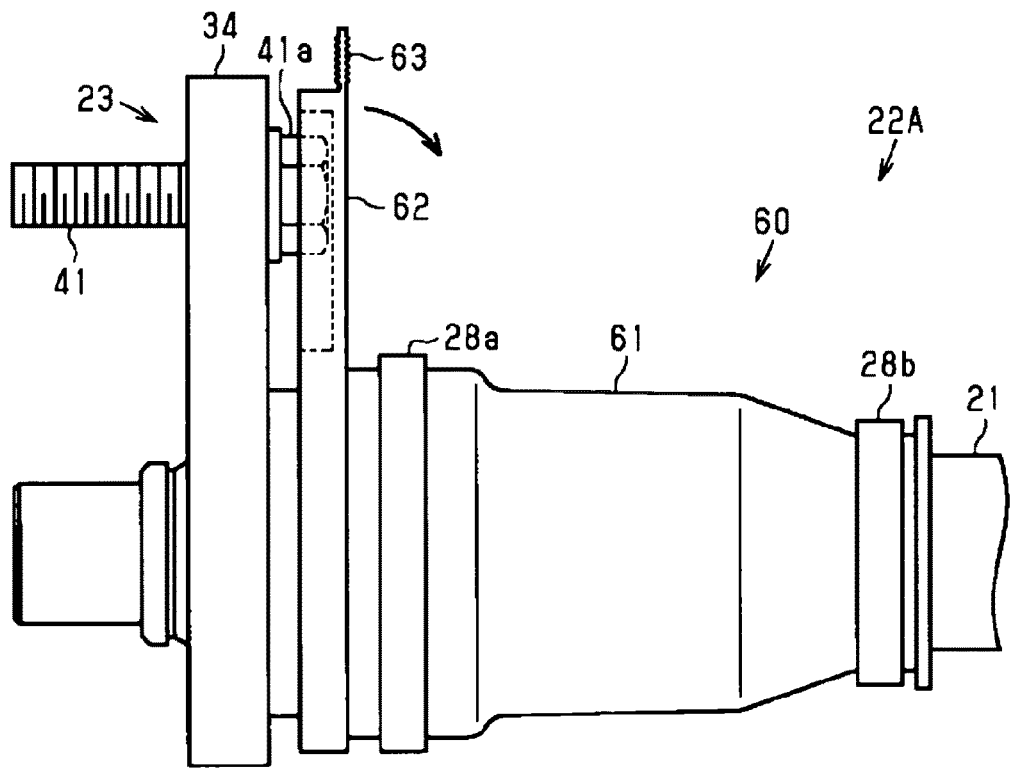
FIG. 3(a) is a schematic side view of a device connector and FIG. 3(b) is a schematic front view of the device connector.
Figure 3B:
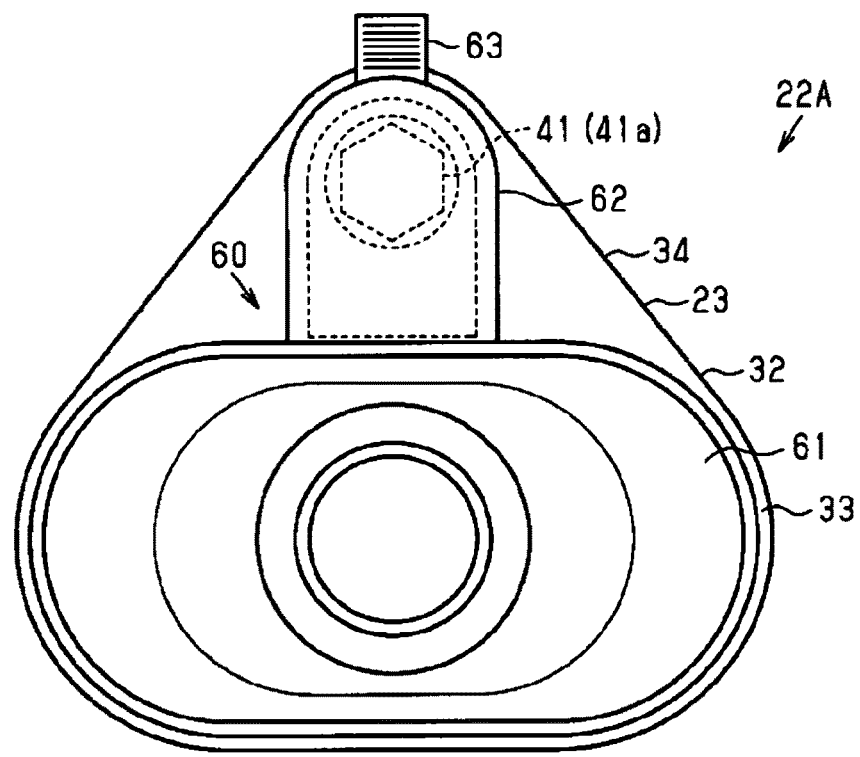

As shown in FIGS. 3(a) and 3(b), a device connector 22A includes: a connector main body 23; a cover member 60 serving as a main body covering portion and a covering member; and fastening bands 28a and 28b serving as main body covering portions and fixing members. The cover member 60 includes: a covering member 61 serving as a main body covering portion; and a bolt covering portion 62. The bolt covering portion 62 covers the head portion 41a of the fastening bolt 41. The bolt covering portion 62 is formed to as to extend outward in the radial direction of the covering member 61 (upward in FIG. 3(a)). A tab portion 63 that extends outward from the leading end of the bolt covering portion 62 is formed on the leading end. The tab portion 63 is formed so as to extend further outward in the radial direction of the covering member 61 from the leading end of the bolt covering portion 62. The tab portion 63 is formed integrally with the bolt covering portion 62. An elastic material such as rubber or elastomer can be used as the material of the cover member 60.

Action

The cover member 60 includes: the covering member 61 that covers the connector main body 23; and the bolt covering portion 62 that covers the head portion 41a of the fastening bolt 41. Also, the covering member 61 and the bolt covering portion 62 are formed integrally. For this reason, there are fewer components compared to a configuration in which a bolt cap or the like for covering the head portion 41a of the fastening bolt 41 is prepared separately. Also, the workability during assembly of the device connector 22A improves due to the fact that there are fewer components. Also, since the cover member 60 need only be attached to the connector main body 23, it is possible to reduce the occurrence of a defect during assembly, such as forgetting to attach the bolt cap.

The bolt covering portion 62 of the cover member 60 is formed so as to cover the head portion 41a of the fastening bolt 41. Accordingly, the fastening bolt 41 is less visible, and operations on the fastening bolt 41 can be suppressed. Accordingly, it is possible to suppress an action of removing the device connector 22A by carelessly loosening the fastening bolt 41.

The tab portion 63 is formed on the leading end of the bolt covering portion 62. By folding back the bolt covering portion 62 using the tab portion 63 as shown in FIG. 3(a), a tool can be attached to the head portion 41a of the fastening bolt 41.

The cover member 60 is composed of rubber or elastomer, for example. For this reason, by letting go of the tab portion 63, the bolt covering portion 62 returns to its original shape and covers the head portion 41a of the fastening bolt 41. For this reason, there are fewer work man-hours compared to a configuration in which a bolt cap is held so as to cover the head portion of the fastening bolt 41, and it is possible to prevent the occurrence of forgetting to cover the head portion of the fastening bolt 41, or the like.

As described above, according to the present embodiment, the following effects are demonstrated.

(2-1) The bolt covering portion 62 is formed integrally with the covering member 61 for covering the connector main body 23. For this reason, the number of components can be reduced compared to a configuration in which a bolt cap or the like for covering the head portion 41a of the fastening bolt 41 is prepared separately. Also, the workability during assembly of the device connector 22A can be improved due to the fact that there are fewer components.

Also, since the cover member 60 need only be attached to the connector main body 23, it is possible to reduce the occurrence of a defect during assembly, such as forgetting to attach the bolt cap.

(2-2) The bolt covering portion 62 of the cover member 60 is formed so as to cover the head portion 41a of the fastening bolt 41. Accordingly, the fastening bolt 41 is less visible, and operations on the fastening bolt 41 can be suppressed. Accordingly, it is possible to suppress an action of removing the device connector 22A by carelessly loosening the fastening bolt 41.

(2-3) The tab portion 63 is formed on the leading end of the bolt covering portion 62. By folding back the bolt covering portion 62 using the tab portion 63 as shown in FIG. 3(a), a tool can be attached to the head portion 41a of the fastening bolt 41.

(2-4) The cover member 60 is composed of rubber or elastomer, for example. For this reason, by letting go of the tab portion 63, the bolt covering portion 62 returns to its original shape and covers the head portion 41a of the fastening bolt 41. For this reason, there are fewer work man-hours compared to a configuration in which a bolt cap is held so as to cover the head portion of the fastening bolt 41, and it is possible to prevent the occurrence of forgetting to cover the head portion of the fastening bolt 41, or the like.

(2-5) The bolt covering portion 62 is formed so as to extend outward in the radial direction of the covering member 61 from the outer circumferential surface of the covering member 61. For this reason, the bolt covering portion 62 for covering the head portion 41a of the fastening bolt 41 can be formed integrally with the cylindrical covering member 61 for covering the connector main body 23.

Third Embodiment

Hereinafter, a third embodiment will be described with reference to FIG. 4.

Note that in this embodiment, constituent members that are the same as those in the above-described embodiment are denoted by the same reference numerals thereas, and description thereof is omitted.

Figure 4A:
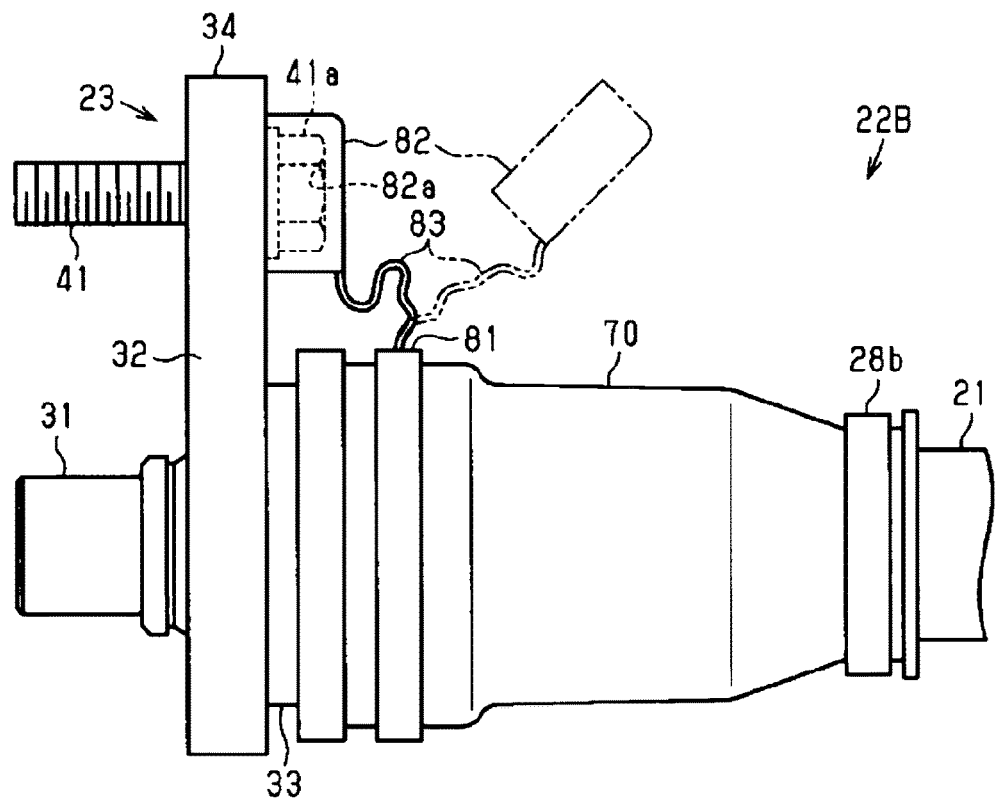
FIG. 4(a) is a schematic side view of the device connector and FIG. 4(b) is a schematic perspective view of a fixing band.

As shown in FIG. 4(a), the device connector 22B includes: the connector main body 23; the cover member 70 serving as a main body covering portion and a covering member; and fastening bands 81 and 28b serving as main body covering portions and fixing members. The cover member 70 of the present embodiment is a covering member serving as a main body covering portion. The cover member (covering member) 70 is cylindrical and is formed so as to cover the connector main body 23, and more specifically, the holding portion 33.

The cover member (covering member) 70 is fixed by being fastened to the holding portion 33 of the connector main body 23 by the fastening band 81 serving as the main body covering portion and the fixing member.

Figure 4B:
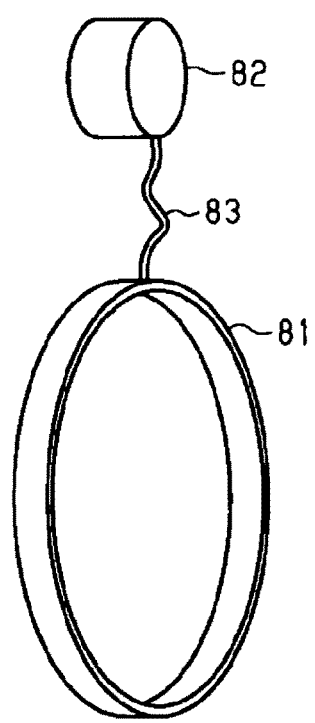

As shown in FIG. 4(b), the bolt covering portion 82 is connected to the fastening band 81 via a coupling portion 83. The bolt covering portion 82 and the coupling portion 83 are formed integrally with the fastening band 81. As shown in FIG. 4(a), the bolt covering portion 82 includes an attachment recessed portion 82a that corresponds to the head portion 41a of the fastening bolt 41. The attachment recessed portion 82a is formed so as to be slightly smaller than the size of the head portion 41a of the fastening bolt 41. The bolt covering portion 82 is attached to the fastening bolt 41 such that the head portion 41a of the fastening bolt 41 is contained in the attachment recessed portion 82a. Rubber, elastomer, or the like can be used as the material of the fastening band 81.

Action

The cover member 70 is a covering member for covering the connector main body 23 and is fixed in a fastened state to the connector main body 23 by the fastening band 81. Also, the bolt covering portion 82 is connected to the fastening band 81 via the coupling portion 83, and the bolt covering portion 82 and the coupling portion 83 are formed integrally with the fastening band 81. For this reason, there are fewer components compared to a configuration in which a bolt cap or the like for covering the head portion 41a of the fastening bolt 41 is prepared separately. Also, the workability during assembly of the device connector 22B improves due to the fact that there are fewer components. Also, since the cover member (covering member) 70 is fixed to the connected main body 23 by the fastening band 81, it is possible to reduce the occurrence of a defect during assembly, such as forgetting to attach a bolt cap.

As described above, according to the present embodiment, the following effects are demonstrated.

(3-1) The bolt covering portion 82 is connected to the fastening band 81 via the coupling portion 83, and the bolt covering portion 82 and the coupling portion 83 are formed integrally with the fastening band 81. For this reason, the number of components can be reduced compared to a configuration in which a bolt cap or the like for covering the head portion 41a of the fastening bolt 41 is prepared separately. Also, the workability during assembly of the device connector 22B improves due to the fact that there are fewer components. Also, since the cover member (covering member) 70 is fixed to the connected main body 23 by the fastening band 81, it is possible to reduce the occurrence of a defect during assembly, such as forgetting to attach a bolt cap.

The present disclosure encompasses the following implementation examples. Reference numerals of constituent elements of the embodiments have been added not to limit the disclosure, but to assist comprehension.

[Supplementary Note 1] In several non-limiting preferable examples, the cover member (24; 60; 70) including the main body covering portion (51; 61; 81) and the bolt covering portion (52; 62; 82) is an integral product made of elastic synthetic resin. According to this configuration, it is possible to reduce the number of components needed to hide the electrical connection portion (31) and the mechanical connection portion (41) between the device connector (22) and the device (11) such that they are not directly visible from the outside of the device connector (22) in a state in which the device connector (22) is connected to the device (11).

[Supplementary Note 2] In several non-limiting preferable examples, a device connector (22) that is to be used along with a device (11) is provided. The device connector (22) includes: a wire protection tube (21); a metal cylindrical shield shell (33) inside of which the wire protection tube (21) ends; a cylindrical or ring-shaped first synthetic resin portion (51; 61; 81) that is fixed or attached to the shield shell (33) so as to cover the outside of the shield shell (33); an electrical connection member (31) that is connected to the device (11) from a predetermined attachment direction (the axis direction of a bolt (41)); a metal stand (34) that supports the electrical connection member (31) and has a screwless through hole (34X) that receives the bolt (41) for connecting the metal stand (34) to the device (11) in a fixed manner from the predetermined attachment direction; and a second synthetic resin portion (52; 62; 82) that is configured to overlap with the screwless through hole (34X) and the bolt (41) of the metal stand (34) such that the bolt (41) is not visible when viewed from the predetermined attachment direction. The first synthetic resin portion (51; 61; 81) and the second synthetic resin portion (52; 62; 82) are constituted as an integral product. According to this configuration, the device connector (22) can be attached in a fixed manner to the device (11) from the predetermined attachment direction. Because the second synthetic resin portion (52; 62; 82) is configured to overlap with the screwless through hole (34X) and the bolt (41), the bolt (41) can be hidden automatically or manually by the second synthetic resin portion (52; 62; 82), and thus forgetting to hide the bolt (41) is not likely to occur.

[Supplementary Note 3] In several non-limiting preferable examples, the first synthetic resin portion (51; 61; 70) is a synthetic resin sleeve (51; 61) that seals the boundary between the wire protection tube (21) and the shield shell (33).

[Supplementary Note 4] In several non-limiting preferable examples, the second synthetic resin portion (52; 62) is a plate-shaped portion (52; 62) that protrudes outward along the metal stand (34) from the first synthetic resin portion (51; 61).

[Supplementary Note 5] In several non-limiting preferable examples, the device connector (22) includes a synthetic resin sleeve (70) that seals the boundary between the wire protection tube (21) and the shield shell (33), and the first synthetic resin portion (81) is a ring-shaped fastening band (81) that is wrapped around the outside of the synthetic resin sleeve (70) in order to fix the synthetic resin sleeve (70) to the shield shell (33).

[Supplementary Note 6] In several non-limiting preferable examples, the second synthetic resin portion (82) is a cap (82) that is configured to fit the head portion (41*a*) of the bolt (41), and the integral product further includes a soft coupling portion (83) that couples the cap (82) and the first synthetic resin portion (81).

It will be appreciated by a person skilled in the art that the present disclosure may also be realized in another specific mode that does not depart from the technical idea. For example, some of the components described in the embodiments (or one or more aspects) may be omitted, or several components may be combined.

The invention claimed is:

1. A cover member comprising:
   a main body covering to be attached to a connector main body including an insertion hole through which a bolt for attaching to a device can be inserted; and
   a bolt covering that is formed integrally with the main body covering and is for covering a head of the bolt inserted through the insertion hole, wherein:
   the main body covering includes: a cylindrical covering for covering the connector main body; and a fixing member for fixing the covering in a fastened state to the connector main body,
   the bolt covering is formed so as to extend outward in a radial direction of the covering from an outer circumferential surface of the covering,
   the bolt covering is an integral product made of elastic synthetic resin that is formed integrally with the covering, and
   a slit is formed in the bolt covering, and part of the head of the bolt is exposed by the slit.

2. A device connector comprising: the cover member according to claim 1; and the connector main body.

* * * * *